United States Patent
Huber et al.

(10) Patent No.: US 12,374,950 B2
(45) Date of Patent: Jul. 29, 2025

(54) CORONA SHIELDING STRIP FOR A HIGH-VOLTAGE ROTATING ELECTRICAL MACHINE

(71) Applicant: INNOMOTICS GMBH, Nuremberg (DE)

(72) Inventors: Jürgen Huber, Erlangen (DE); Dieter Schirm, Breitengüßbach (DE); Matthias Übler, Ursensollen (DE); Steffen Lang, Hallerndorf (DE); Torsten Rossow, Berlin (DE); Michael Nagel, Gremsdorf (DE)

(73) Assignee: INNOMOTICS GMBH, Nuremberg (DE)

( * ) Notice: Subject to any disclaimer, the term of this patent is extended or adjusted under 35 U.S.C. 154(b) by 0 days.

(21) Appl. No.: 18/251,492

(22) PCT Filed: Nov. 2, 2021

(86) PCT No.: PCT/EP2021/080326
§ 371 (c)(1),
(2) Date: May 2, 2023

(87) PCT Pub. No.: WO2022/096429
PCT Pub. Date: May 12, 2022

(65) Prior Publication Data
US 2024/0006948 A1    Jan. 4, 2024

(30) Foreign Application Priority Data

Nov. 5, 2020 (EP) .................................. 20205914

(51) Int. Cl.
*H02K 3/40* (2006.01)
*C09J 7/21* (2018.01)
(Continued)

(52) U.S. Cl.
CPC .................. *H02K 3/40* (2013.01); *C09J 7/21* (2018.01); *C09J 7/30* (2018.01); *C09J 9/02* (2013.01);
(Continued)

(58) Field of Classification Search
CPC ...... H02K 3/40; H02K 3/30; C09J 7/21; C09J 7/30; C09J 9/02; C09J 11/04; C09J 11/06;
(Continued)

(56) References Cited

U.S. PATENT DOCUMENTS 5,747,599 A * 5/1998 Ohnishi ............... C09D 163/00
525/934
6,043,582 A * 3/2000 Markovitz ............... H02K 3/30
310/201

(Continued)

FOREIGN PATENT DOCUMENTS

CN  103554436 B   2/2014 ............. C08G 59/20
CN  107429139 A  12/2017 ............. C09J 171/02
(Continued)

OTHER PUBLICATIONS

Search Report for International Application No. PCT/EP2021/080326, 12 pages, Feb. 11, 222.
(Continued)

*Primary Examiner* — Robert S Jones, Jr.
*Assistant Examiner* — Jaison P Thomas
(74) *Attorney, Agent, or Firm* — Slayden Grubert Beard PLLC

(57) ABSTRACT

Various embodiments of the teachings herein include a corona shielding tape for further processing to give an insulation system comprising an impregnated winding with potential control via outer corona shielding "AGS" and/or internal potential controller "IPS" and/or terminal corona shielding "EGS", the insulation system being producible by
(Continued)

impregnating the winding with an anhydride-free and resin-based impregnating agent at 45-85° C. and under reduced pressure. The corona shielding tape may include: a carrier tape; an electrically conductive and/or partly conductive filler in a polymer matrix; and a tape accelerator suitable for curing and/or gelation of the impregnating agent. The polymer matrix contains at least one polyvinylalcohol and/or a polyvinylalcohol copolymer. The accelerator is selected from the group consisting of: superacids and superacid salts suitable for acceleration of a cationic homopolymerization of the resin-based anhydride-free impregnating agent.

12 Claims, 2 Drawing Sheets

(51) Int. Cl.
    *C09J 7/30* (2018.01)
    *C09J 9/02* (2006.01)
    *C09J 11/04* (2006.01)
    *C09J 11/06* (2006.01)
    *H02K 3/30* (2006.01)

(52) U.S. Cl.
    CPC ............ *C09J 11/04* (2013.01); *C09J 11/06* (2013.01); *H02K 3/30* (2013.01); *C09J 2203/326* (2013.01); *C09J 2301/408* (2020.08); *C09J 2301/414* (2020.08); *C09J 2429/00* (2013.01); *C09J 2463/00* (2013.01)

(58) Field of Classification Search
    CPC ............ C09J 2203/326; C09J 2301/408; C09J 2301/414; C09J 2429/00; C09J 2463/00; C08K 9/02; C08K 3/22; C08K 2201/001; C08K 5/372; H01B 3/40; H01B 3/04
    See application file for complete search history.

(56) References Cited

U.S. PATENT DOCUMENTS

| 2005/0189834 A1 | 9/2005 | Ikeda et al. .................. 310/179 |
| 2018/0053581 A1 | 2/2018 | Huber et al. |
| 2018/0094177 A1 | 4/2018 | Huber |
| 2018/0204649 A1 | 7/2018 | Huber et al. |
| 2018/0215960 A1 | 8/2018 | Huber et al. |
| 2019/0080818 A1 | 3/2019 | Beisele et al. |
| 2021/0313857 A1 | 10/2021 | Huber ...................... H02K 3/30 |

FOREIGN PATENT DOCUMENTS

| EP | 3 389 058 | 10/2018 | ............. H01B 3/00 |
| EP | 3389058 A1 * | 10/2018 | ............. C08J 3/226 |
| EP | 3 716 290 | 9/2020 | ............. H01B 3/40 |
| EP | 3716290 A1 * | 9/2020 | |
| JP | H09 95644 | 4/1987 | ........... C09D 163/00 |
| JP | 2002212355 A | 7/2002 | ............. C08K 3/22 |
| RU | 2704804 C2 | 10/2019 | ............. C08G 59/62 |
| RU | 2721163 C2 | 5/2020 | ............. H01B 3/04 |
| RU | 2721846 C2 | 5/2020 | ............. H01B 3/40 |

OTHER PUBLICATIONS

Search Report for EP Application No. 20205914.3, 8 pages, May 3, 2021.
Russian Office Action, Application No. 2023114108/07(029934), 19 pages, Nov. 20, 2023.
Chinese Office Action, Application No. 202180074618.0, 8 pages, Jun. 21, 2024.
Chinese Office Action, Application No. 202180072618.0, 9 pages, Dec. 6, 2024.

* cited by examiner

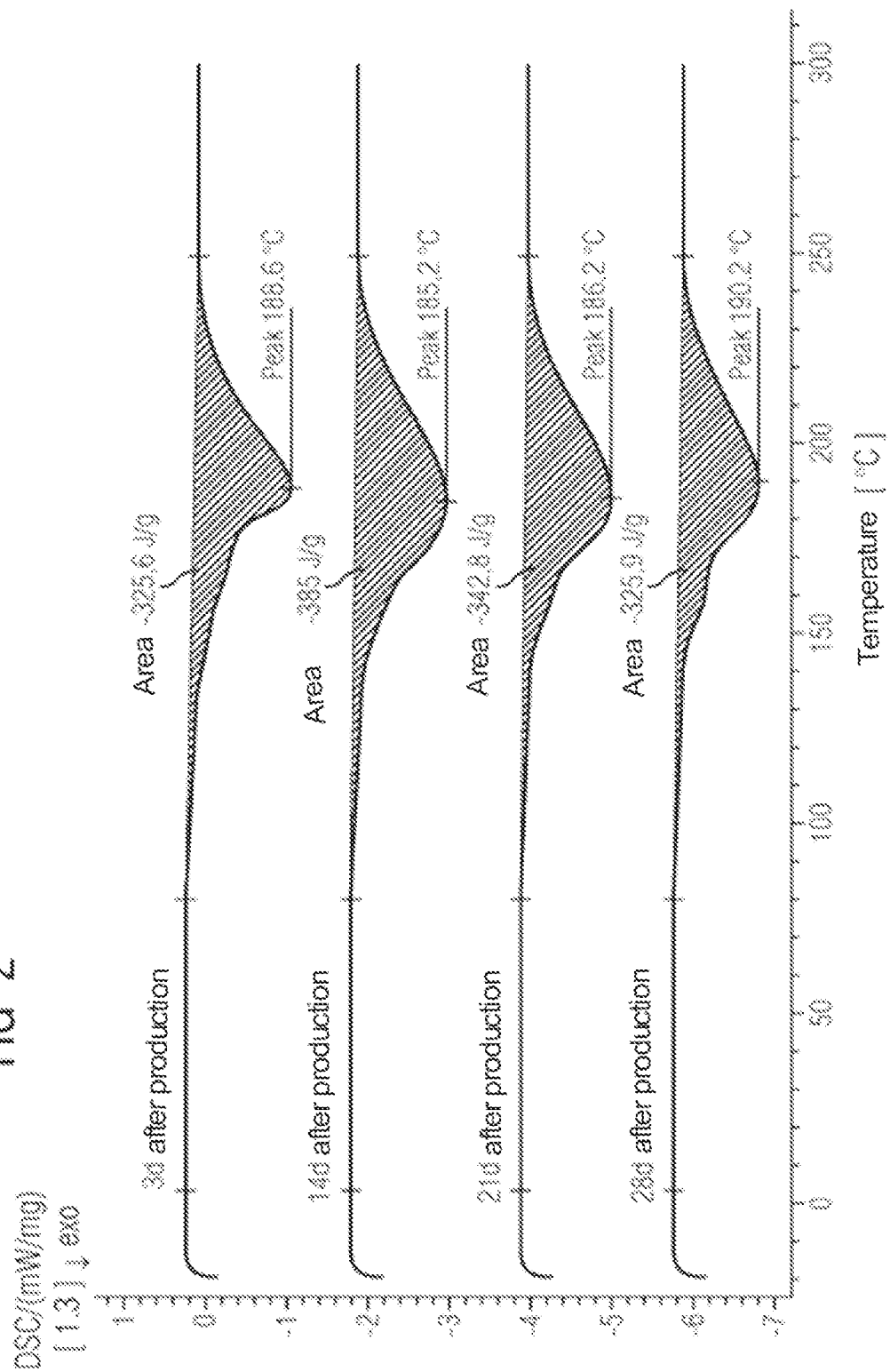

CORONA SHIELDING STRIP FOR A HIGH-VOLTAGE ROTATING ELECTRICAL MACHINE

CROSS-REFERENCE TO RELATED APPLICATIONS

This application is a U.S. National Stage Application of International Application No. PCT/EP2021/080326 filed Nov. 2, 2021, which designates the United States of America, and claims priority to EP Application No. 20205914.3 filed Nov. 5, 2020, the contents of which are hereby incorporated by reference in their entirety.

TECHNICAL FIELD

The present disclosure relates to electrical machines. Various embodiments of the teachings herein include corona shielding tapes for irritating electrical high-voltage machine with an insulation system producible by the vacuum pressure impregnation process (VPI process) and/or electrical machines having an insulation system producible by the use of the corona shielding tape.

BACKGROUND

In the production of an insulation system, depending on the rated voltage of the rotating electrical machine, various combinations of components of an insulation system are used. For example, in the case of motors with a rated voltage of roughly greater than 2 kV, there is a conductive layer for field homogenization at the slot exit site, the outer corona shield, AGS. Over and above a rated voltage of roughly 6 kV, an AGS is generally strengthened at the ends by adding a terminal corona shield EGS, and, over and above a rated voltage of about 12 kV, the insulation system on the main insulation is strengthened with an internal potential controller IPS.

Owing to physiological concerns with respect to the use of anhydride-containing crosslinkers that was customary to date in the impregnating means of the insulation system, especially the insulation systems producible by VPI, the anhydride is increasingly being replaced by anhydride-free impregnating agents. This replacement entails a whole series of adaptation problems, since the wrapping tapes and/or corona shielding tapes, which in turn comprise organic binders such as the tape adhesive, polymer-based matrix materials and indeed curing catalyst as well in the case of reactive corona protection tapes, have to be matched to the newly used anhydride-free impregnating agents.

There is no formulation to date for an insulation system with AGS, EGS and/or IPS that comprises a corona shielding tape, itself comprising several sensitive components such as the tape adhesive, the polymer matrix, the fillers, the coatings thereof and an anhydride-free impregnating agent, which can be processed in a standard VPI process to give a usable insulation system.

The conductive layers of the IPS and of the AGS generally consist of carbon black- and/or graphite-containing composite material based on a polymeric matrix. No component of the composite material, either the carbon black/graphite or the polymeric matrix, is resistant to partial discharges. If the partial discharge hits the conductive layer, for example, the carbon black will react with the surrounding oxygen to give $CO_2$. The same applies to the polymeric matrix.

The main insulation, or AGS, EGS and IPS, are generally formed by winding of corona tape or corona shielding tape impregnated with an impregnating agent. The corona tape of the main insulation generally comprises a barrier material, such as mica for insulation, while the corona shielding tape comprises electrically conductive or partly conductive fillers, such as carbon black etc. In the case of global VPI, by contrast with single VPI, IPS, AGS and/or EGS are generally applied as tapes, preferably on as yet unimpregnated coils/bars and subsequently—more preferably—impregnated with impregnating agents in an impregnation method.

Especially the tertiary amines and/or organic zinc salts that have been highly suitable to date for anhydride-containing impregnating agents can no longer be used as what are called tape accelerators for the new anhydride-free impregnating agents, because these crosslink only inadequately under the conditions of the VPI process. This results ultimately in uncured, soft regions in parts of the AGS, EGS, IPS and/or the main insulation and/or to polymers having a low glass transition temperature. A low glass transition temperature should also be avoided locally since these regions have mechanically and electrically adequate properties and lead to distinctly earlier degradation. In operation, these regions of low durability are rapidly degraded or destroyed thermally and electrically.

Corona shielding tapes as part of the insulation system are used in rotating electrical high-voltage machines. Rotating high-voltage machines are, for example, motors or else generators in a power plant for generation of electrical energy. Such rotating high-speed machines especially have a stator winding on which particularly high demands are placed with regard to integrity and reliability. In particular, the insulation system of the stator winding, at the interface between the main insulation and the laminated stack, especially in the case of rotating electrical machines over and above a rated voltage of about 2 kV, of the stator winding is subject to high stress by virtue of high thermal, thermomechanical, dynamic and electrochemical operating stress, as a result of which there is a high risk of damage to the insulation system of the stator winding through partial discharge.

The stator winding has a conductor element which is electrically insulated by the main insulation and is mounted in a slot within the laminated stack. In the operation of the rotating electrical machine, the stator is subject to thermal alternating current stress, which causes mechanical damage in the main insulation, caused by different rates of thermal expansion and thermal conductivities of the conductor, the main insulation and the laminated stack. This can result in localized detachment of the main insulation, which gives rise to cavities between the main insulation and the laminated stack in which partial discharges can occur. The partial discharges can lead to damage to the main insulation, which in the worst case can lead to a ground fault between the laminated stack and conductor, as a result of which the machine is no longer operable. Conventionally, the conductor with its main insulation protrudes at the slot exits, where the interface between the conductor and the main insulation is disposed, which forms a sliding arrangement. This is apparent, for example, from FIG. 1 of EP 2362399B1, where the detail of the turbo generator stator depicted therein corresponds in schematic terms to the slot exit site being discussed here.

The main insulation of the winding with respect to the laminated stack is a system under high electrical stress. High voltages arise in operation, which have to be dissipated in the insulation volume between the conductor bar and the laminated stack at ground potential. At the edges of the laminates in the laminated stack, significant increases in field arise, which in turn cause partial discharges and ultimately lead to premature aging and in the worst case to destruction of the insulation.

The exit site of the stator rods/coil ends from the laminated stack, the slot exit site, is characterized by the meeting of two insulating materials: the gaseous and the solid, and the AGS and/or IPS or the laminated stack. In this region, an interface forms between the main insulation in the solid state of matter and a gaseous medium, usually air or hydrogen. The resulting dielectric divide between the main insulation and the air gives rise to a conventional sliding arrangement which, as well as a purely radial field component $E_{rad}$, which is at right angles to the conductor and occurs in the region of the laminated stack, additionally has a tangential field component Et an that arises along the conductor after the end of the AGS. The interfaces that are under tangential stress as a result, for example main insulation against air, are particular weak points in an insulation arrangement.

Owing to the low electrical resistance of air, even in the case of comparatively low voltages in this region of the "laminated stack-insulation system-air" triple point, at the end of the outer corona shield "AGS", there can already be partial discharges caused by the local tangential increase in field strength of about 0.5 kV/mm in the case of a clean surface, which, in the case of a further increase in the voltage to give partial discharges, can spread along the insulation material surface until there is electrical flashover, characterized by a short circuit between conductor and ground.

In order to suppress these electrical sliding discharges, in the case of electrically rotating machines, in addition to the outer corona shield "AGS", over and above a rated voltage of 6 kV, a resistively capacitative field controller is connected to the AGS, in the form of a terminal corona shield "EGS". In the calculation and design of a terminal corona shield, it should be ensured that the highest electrothermal stress on the system is not at operating voltage, but rather in the checking of the insulation system with elevated test voltage. Formation of partial discharges at the surface ultimately result in destruction of the insulation material. The terminal corona shield, just like the outer corona shield, is a resistive coating directly on the surface of the main insulation. By contrast with the "AGS", the outer corona shield, which has a surface resistance of about 1000-10 000 ohms, the "EGS", the terminal corona shield, has a much higher electrical surface resistance which is in a non-linear configuration and is about $5 \times 10^9$ ohms at a field strength of 100 V/mm. Quite generally, the relevant resistance range of the EGS may be reported as $2 \times 10^8$ to $1 \times 10^{13}$ ohms.

Especially as a result of heating, electrical erosion and chemical degradation, the EGS can be destroyed, hence damaging the insulation system, and ultimately leading to flashover as a consequence of destruction of the terminal corona shield. Through local evolution of heat, a change in operating point can additionally lead to destruction of the working of the insulation system and to a rise in dielectric losses.

The AGS has a certain square resistance that must not be lower or higher than a particular lower and upper limit. When the value is lower than the limit, high induced circulating currents that arise via the ends of the laminated stack and the outer corona shield can lead to high-current arcs between two laminates in the laminated stack, resulting in high electrical losses. When the resistance is too high, there can again be high-voltage spark erosion, in which case the AGS no longer acts as a field homogenizer but as an insulator. Ideally, an external corona shield has marked anisotropy in the resistance characteristics; resistance in tangential direction, i.e. in axial direction, should be high, and low in radial direction.

In practice, this desirable property of the AGS, however, is unachievable, and so the AGS in tangential direction has always had lower resistance than in radial direction. Information about these phenomena can also be found in relevant technical literature, for example in "Hochspannungstechnik" [High-Voltage Technology] by A. Küchler, Springer Verlag, vol. 15, 2009, ISBN 3-540-78412-8, and "Design Dependent Slot Discharge and Vibration Sparking on High-Voltage Windings" by M. Liese and M. Brown, IEEE Trans DIE, August 2008, pp. 927-932.

SUMMARY

The teachings of the present disclosure provide a corona shielding tape for further processing by the VPI method, comprising a carrier tape, at least one tape accelerator for the impregnating resin and at least one polymeric matrix material with an electrically conductive, optionally coated filler, wherein the tape accelerator present in the corona shielding tape is capable of having a curing-accelerating effect on an anhydride-free impregnating agent, especially based on epoxy resin.

As an example, some embodiments of the teachings herein include a corona shielding tape for further processing to give an insulation system, comprising an impregnated winding with potential control via outer corona shielding "AGS" and/or internal potential controller "IPS" and/or terminal corona shielding "EGS", the insulation system being producible by impregnating the winding with an anhydride-free and resin-based impregnating agent at 45-85° C. and under reduced pressure, wherein the corona shielding tape comprises at least a carrier tape, an electrically conductive and/or partly conductive filler in a polymer matrix and at least one tape accelerator suitable for curing and/or gelation of the impregnating agent, characterized in that the polymer matrix contains at least one polyvinylalcohol and/or a polyvinylalcohol copolymer and the at least one tape accelerator is selected from the group of the superacids and/or the superacid salts which is suitable for acceleration of a cationic homopolymerization of the resin-based anhydride-free impregnating agent.

In some embodiments, the basis of the resin-based impregnating agent is an anhydride-free epoxy resin.

In some embodiments, at least one ion of a superacid salt which is at least part of the tape accelerator is a sulfonium cation.

In some embodiments, at least one ion of a superacid salt which is at least part of the tape accelerator is a sulfonium cation with an aryl radical.

The corona shielding tape as claimed in any of the preceding claims, in which multiple tape accelerators are present in combination.

In some embodiments, a sulfonium cation in the form of an arylalkyl-sulfonium cation is present.

In some embodiments, at least one dialkylarylsulfonium cation is present.

In some embodiments, at least one diarylalkylsulfonium cation is present.

In some embodiments, an aryl radical of a sulfonium cation is in substituted form.

In some embodiments, a tape accelerator having a sulfonium cation having an aryl radical comprising a phenyl radical which is acetyloxy is present.

In some embodiments, the corona shielding tape comprises, as tape accelerator, a superacid salt having the following chemical structure:

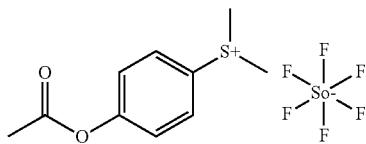

In some embodiments, the polymer matrix comprises multiple polyvinyl-alcohols.

In some embodiments, the polymer matrix comprises at least one polyvinylalcohol having crosslinked components.

In some embodiments, the electrically conductive and/or partly conductive filler may comprise at least one component selected from the group comprising carbon black, graphite, carbon nanotubes—CNTs, antimony-doped tin oxide, silicon carbide and/or aluminum-doped silicon carbide, the respective component being in doped or undoped form, in coated or uncoated form, in doped coated or undoped coated form.

As another example, some embodiments include the use of a corona shielding tape as described herein for production of an insulation system with AGS, IPS and/or EGS.

As another example, some embodiments include an electrical rotating machine having an insulation system obtainable via a use as described herein.

BRIEF DESCRIPTION OF THE DRAWINGS

FIG. 2 is a graph showing multiple traces of DSC per mW/mg over temperature based on days after production.

DETAILED DESCRIPTION

Figure 1:
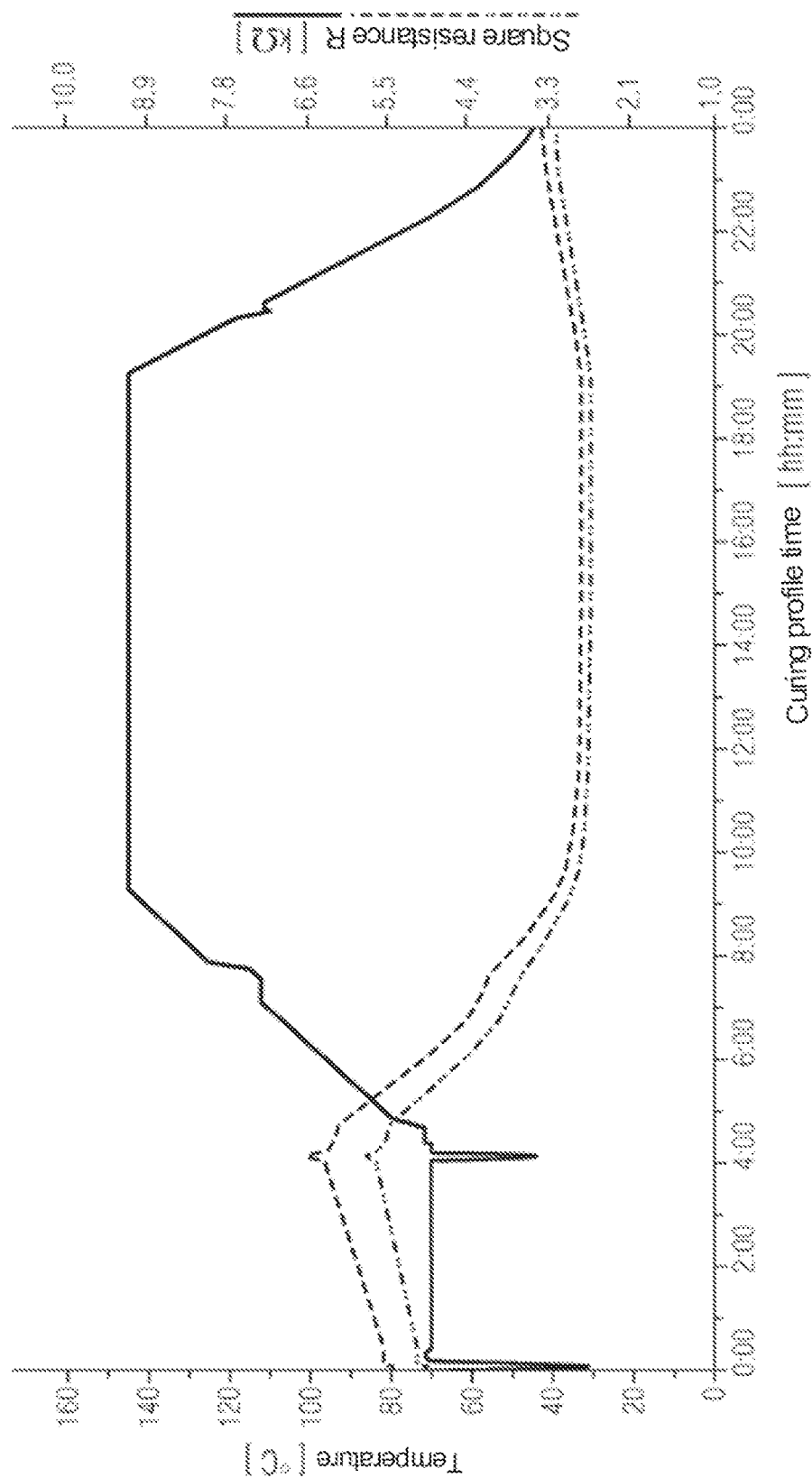
FIG. 1 is a graph showing a traces of temperature and square resistance over curing profile time.

Some embodiments of the teachings of the present disclosure include a corona shielding tape for further processing to give an insulation system comprising a winding and potential controller by external corona shielding and/or internal potential control and/or terminal corona shielding, the insulation system being producible by impregnating the winding with an anhydride-free and resin-based impregnating agent at 45 to 85° C. and under reduced pressure, for example by means of VPI impregnation, wherein the corona shielding tape comprises at least a carrier tape, an electrically conductive and/or partly conductive filler in a polymer matrix and at least one tape accelerator suitable for curing and/or gelation of the impregnating agent, characterized in that the polymer matrix contains at least one polyvinylalcohol and/or a polyvinylalcohol copolymer and in that the at least one tape accelerator is selected from the group of the superacid salts, being suitable for acceleration of a cationic homopolymerization of the resin-based anhydride-free impregnating agent.

In some embodiments, the basis of the resin-based impregnating agent is an epoxy resin, especially also an epoxy resin mixture, for example an epoxy resin mixture comprising one or more cycloaliphatic epoxy resins. Siloxane, for example, may also be present in this mixture, such that curing of the impregnating agent affords a thermoset with a backbone comprising —O—$SiR_2$—O— units.

In some embodiments, the impregnating agent is a resin which is especially free of phthalic anhydride or phthalic anhydride derivatives or an epoxy-based resin mixture, comprising at least one cycloaliphatic epoxy resin and an epoxy resin based on bisphenol A diglycidyl ether and/or bisphenol F diglycidyl ether and/or based on epoxy novolak. For example, the impregnation mixture is one based on cycloaliphatic epoxy resin and bisphenol A diglycidyl ether in a mixing ratio within a range from 50:50 to especially in a mixing ratio of 80:20 (m/m).

For example, the polymer matrix comprises the tape adhesive and—at least in part—the tape accelerator dissolved and/or finely distributed therein, also called "tape catalyst". The tape accelerator serves to gelate a mobile impregnating resin that acts, for example, in a vacuum pressure impregnation (VPI) on the corona shielding tape and the main insulation of the stator winding. This typically occurs at elevated temperatures, 45° C. to 85° C. After the impregnation, stator windings are then subjected to further thermal curing in the laminated stator stack.

In some embodiments, the at least one tape accelerator is present in the polymeric matrix with the fillers. During the impregnation, it mixes at least partly with the impregnating agent and/or can at least partly migrate into the impregnating agent and hence serves to gelate the impregnating agent prior to curing thereof in the subsequent heat treatment step of the impregnation method.

In some embodiments, the tape accelerator, for example in the form of a superacid salt, is ultrafinely distributed and/or dissolved in the polymer matrix or the tape adhesive, i.e. comprising at least one polyvinylalcohol. Owing to the required and desired storage stability of the corona shielding tape, it may be advantageous when the tape accelerator present in the corona shielding tape, in the form of a superacid and/or a superacid salt, reacts only on contact with the impregnating agent and at elevated temperatures of 45° C. to 85° C. Prior reaction with the polymeric matrix is undesirable because the tape accelerator would then be "used up", and the impregnating agent could no longer start to cure, gelate or fully cure. Therefore, that tape accelerator, although in the form of extremely reactive superacid and/or a derivative thereof, reacts only to an insignificant degree, if at all, with the polymer matrix of the corona shielding tape under conditions up to 70° C.

In some embodiments, the accelerator is present in the carrier tape, for example, in an amount within a range from 0.1 g/m² to g/m², especially from 0.25 g/m² to 10 g/m², e.g. in an amount of 0.5 g/m² to 5 g/m². It is possible here for the tape accelerator and tape accelerator concentration included in the components of the insulation system to be the same or different.

The "components of the insulation system" that are particularly affected here are, for example,
the winding of the main insulation—without conductive or partly conductive fillers, since the main insulation is electrically insulating,
the winding of the IPS, AGS and/or EGS, which have gradated electrical conductivity or partial conductivity; see above.

In order to avoid partial discharges, the main insulation may be shielded against cavities and detachment of material by winding bars/coils having an internal and external conductive layer, and indeed by means of internal potential controller IPS and AGS, as elucidated above. An EGS may then be applied to the AGS.

EP 2362399 and DE 19839285 C1 disclose corona shielding tapes in which there is a planar filler bound within a polymeric matrix. The planar filler described consists of a mica substrate coated with doped metal oxide, for example titanium oxide and/or tin oxide. This filler is especially more resistant to partial discharges than the carbon-based fillers.

Quite fundamentally, in the case of the polymeric matrices filled with planar fillers, electrical resistance in tape direction is much lower than that at right angles through the tape, which in turn reduces electrical conductivity in radial direction. Addition of round fillers in which fused silica or ground quartz is used as substrate, which may in turn likewise be coated with doped metal oxide, can reduce radial resistance.

In some embodiments, the electrically conductive and/or partly conductive filler has at least one component selected from the group comprising carbon black, graphite, carbon nanotubes—CNTs, antimony-doped tin oxide, silicon carbide and/or aluminum-doped silicon carbide, where the respective component may be in doped or undoped form, in coated or uncoated form, in doped coated or undoped coated form.

In order to reduce the excessive increase in field strength in the region of the end of the outer corona shield, a capacitatively resistant field controller is used. The capacitive controller is implemented via the main insulation, while the resistive control takes place via the terminal corona shield (EGS). This involves conductive surface coatings having a square resistance of about $10^8$ to $10^{10}$ ohms at a field strength of 100 V/mm. With the aid of the significant nonlinearity of the materials used in the EGS, an attempt is made to displace the electrical field from the regions of high field strengths. The cause of this is the reduction in specific resistance with rising electrical field strength.

The ohmic surface coatings may be produced either by painting from dry and/or curable resins that are applied directly to the insulation material surface and/or together with the production of the wound main insulation, but these are already wound up as tapes before the production or impregnation of the main insulation, either in the form of a prepreg or of an already cured porous tape.

The main insulation of the winding is then impregnated with an impregnating resin and, for example, by a vacuum pressure impregnation process (VPI) executed therewith. Conventionally, particularly epoxy resins and/or epoxy resin mixtures with anhydrides as curing agents are used here. Owing to the respiratory pathway-sensitizing effect and corresponding concerns about the unrestricted use of anhydrides as curing agent, especially of phthalic anhydrides, and/or else of phthalic anhydride derivatives, only anhydride-free, i.e. phthalic anhydride- or phthalic anhydride derivative-free, impregnating agents are used in the present context. WO2016/124387 discloses, for example, an insulation system based on an epoxy resin with an anhydride-free impregnating agent which is homopolymerizable.

A reactive corona shielding tape accordingly comprises, on a flexible carrier such as film or nonwoven and/or woven fabric, referred to hereinafter as "carrier tape", an applied electrically conductive and/or semiconductive or partly conductive material bonded to the carrier tape, bonded to itself and optionally bonded to a final outer layer and/or a further layer by means of a tape adhesive that constitutes the polymer matrix and/or comprises the polymer matrix.

Electrically conductive and/or semiconductive or partly conductive material refers, for example, to carbon-based fillers and/or ceramic, especially mica-based, material having a partly conductive coating, especially a conductive coating achieved by doping, for example composed of titanium oxide and/or tin oxide, and/or with or without aluminum-doped silicon carbide. On the other hand, it is alternatively or additionally possible for the electrically conductive and/or semiconductive or partly conductive materials, such as doped titanium oxide and/or tin oxide, and/or with and without aluminum-doped silicon carbide, also to be present without substrate—for example mica—as filler.

The tape which is used for production of the external corona shielding winding comprises at least one binder, generally a polymer and a mixture of planar and/or globular and/or tubular electrically conductive and/or partly conductive fillers that optionally have a coating that may be doped under some circumstances.

In some embodiments, the polymeric matrix comprises two or more polyvinylalcohols. In principle, polyvinylalcohols according to the invention are usable as polymer matrix or part of a polymer matrix of the corona shielding tape, but specified hereinafter by way of example are some polyvinylalcohols that are usable alone or in combination.

Polyvinylalcohol with CAS number 9002-89-5 and the empirical formula $(-C_2H_4O-)_n$ of the repeat unit is a thermoplastic and is in the form of a crystalline, white to yellowish, water-soluble polymer. By contrast with most vinyl polymers, polyvinylalcohol cannot be produced by simple polymerization of the corresponding monomer. The ethenol monomer needed for the purpose exists only in its tautomeric form as acetaldehyde. Polyvinylalcohols are obtained by transesterification and/or by alkaline hydrolysis of polyvinylacetate. The hydrolysis has good controllability. There are polyvinylalcohol copolymers and various derivatives in which some of the hydroxyl groups have been replaced by groups that react in a chemically similar manner, such as siloxanes.

Suitable polyvinyl alcohols have, for example, a level of hydrolysis of greater than 70 mol %. A small number or multiple hydroxyl groups are substituted by silicon-containing compounds.

In some embodiments, the polymeric matrix in the tape comprises polyvinylalcohol with crosslinked components.

In some embodiments, the polymeric matrix in the tape comprises one or more aldehyde-modified and/or melamine-crosslinked polyvinylalcohol(s).

In some embodiments, the polymeric matrix comprises at least one polymeric binder which is a polyvinylalcohol having a level of hydrolysis of at least 70 mol %, especially at least 85 mol %, e.g., of at least 87 mol % or more.

In some embodiments, the polymeric matrix comprises at least one polyvinylalcohols in which the hydroxyl groups of the polyvinylalcohol have been at least partly replaced by siloxane and/or silanol groups.

In order to protect the constituents of a corona shielding tape, especially also in a finished insulation system, suitable methods of analysis include IR, UV and/or VIS spectroscopy methods and/or scanning electron analysis methods, including x-ray spectroscopy, for example EDX.

In some embodiments, the electrically conductive filler comprises mainly carbon-based components, for example a carbon polymorph—preferably carbon black, graphite and carbon nanotubes.

In some embodiments, the electrically conductive filler comprises a silicon carbide, undoped and/or doped silicon carbide.

In some embodiments, the electrically conductive filler comprises particles that are at least partly composed of metal oxide, especially a mixed oxide. A metal oxide is a compound between a metal and oxygen, where the oxygen in the formula in a formal sense, i.e. in simplified form, has a double negative charge. In principle, the oxygen is the electric negative partner in the compound. Hence the name "oxide". A mixed oxide—MOX for short—is a substance in which there is more than one metal cation in an oxidic compound, i.e., for example, titanium aluminum oxide or iron nickel oxide or the like.

In some embodiments, a filler is used, which has a coating of a doped tin oxide and/or a doped titanium oxide and/or consists of a doped tin oxide and/or titanium oxide. The filler particles may take the form of hollow bodies, of solid particles, of coated particles and/or of—shell particles.

At least one fraction of but not necessarily exclusively platelet-shaped particles has been applied to the carrier tape, which are held together by a polymer matrix, i.e. the binder, and hence form the corona shielding tape. In order to adjust the electrical resistance, it may be advantageous here to supplement the fraction of platelet-shaped filler particles with spherical, i.e. globular, filler particles.

In some embodiments, the corona shielding tape has a basis weight of <150 g/m$^2$, or <100 g/m$^2$.

In some embodiments, the carrier tape comprises reinforcing fibers, for example in the form of a weave and/or of a fiber composite, introduced into and/or onto the polymeric matrix with the electrically conductive filler and/or bonded thereto by the binder.

In some embodiments, the carrier tape has a basis weight of 30-60 g/m$^2$.

In some embodiments, the reinforcing fibers are, for example, glass fibers and/or polyethylene terephthalate—PET—fibers.

In some embodiments, the carrier tape has been coated with a primer. It may be especially advantageous here when the carrier tape has been coated with a primer at up to 5 g/m$^2$.

In particular, it has been found to be advantageous when the primer of the adhesive tape comprises polyvinylalcohol, epoxy functionalities and/or amine functionalities. Primer is a priming coating that improves the cut resistance of the reinforcing fibres and/or the carrier tape or weave, and is prepared for wetting and binding with the polymeric matrix.

In some embodiments, the amount of the coating of the carrier tape with the polymeric matrix that contains the at least one fraction of electrically conductive filler and/or optionally also the at least one tape accelerator contains within a range from 20 g/m$^2$ to 100 g/m$^2$, especially within a range from 20 g/m$^2$ to 60 g/m$^2$, e.g. within a range from 30 g/m$^2$ to 45 g/m$^2$.

In some embodiments, the corona shielding tape is used for production of an external corona shielding system and/or an internal potential control system and/or a terminal corona shielding system. It may be advantageous here when the square resistance and/or area resistance of an external corona shielding system produced by means of a corona shielding tape according to the present invention and/or of an internal potential controller system is within a range from 0.01 kohm to 100 kohm, measured at a field strength of 1 V/mm.

In particular, the square resistance and/or area resistance of such an internal potential controller may be within a range from kohm to 10 kohm, within a range from 0.01 to 5 kohm, or within a range from 0.05 to 1 kohm, and/or the square resistance values of such an outer corona shield are within a range from 0.1 to 100 kohm, from 0.1 kohm to 50 kohm, or within a range from 1 kohm to kohm, in each case measured at a field strength of 1 V/mm.

In the production of a terminal corona shield by means of a corona shielding tape, it may be advantageous when there is an area resistance within a range from $1 \times 10^8$ to $1 \times 10^{12}$ ohms, or within a range from $1 \times 10^8$ to $1 \times 10^{12}$ ohms, at a field strength of 100 V/mm.

The present disclosure describes corona shielding tapes for an electrical high-voltage machine comprising anhydride-free, especially phthalic anhydride derivative-free, epoxy resins. The corona shielding tape presented here for the first time, with its components, especially the binding polymer matrix and the incorporated cationic tape accelerator, is adjusted to the new, for example including alkyl phthalic anhydride derivative-free, VPI impregnating resins based on epoxy resin.

In some embodiments, the tape accelerator includes an ionogenic compound composed of one or more sulfonium-containing cation(s) with one or more anions, especially anions of complex structure, for example hexafluoroantimonate anion(s), each suitable for use in a VPI process for producing an insulation system with an anhydride-free impregnating agent. The tape accelerator is a cationic tape accelerator and may therefore be in ionogenic form. In some embodiments, the tape accelerator has a sulfonium-containing cation.

For example, a suitable cationic tape accelerator is a chemical compound covered by one of the structural formulae I, II or III:

Superacid salts with sulfonium cation structure I

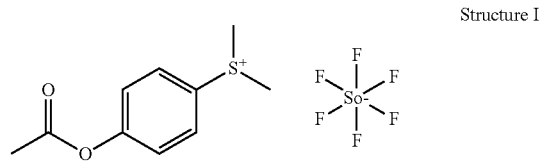

Structure I

Cation structure II

Aryl
|
S$^+$
/ \
Aryl   Alkyl

Diarylalkylsulfonium cation

Cation structure III

Alkyl
|
S$^+$
/ \
Aryl   Alkyl

Dialkylarylsulfonium cation

The sulfonium cations I, II and III form the corresponding superacid salts with complex anions such as BF$_4^-$, PF$_6^-$, AsF$_6^-$, SbF$_5$(OH)$^-$, AsF$_5$(OH)$^-$, Al[(OC(CF$_3$)$_3$)$_4^-$, which are usable in the present context as tape accelerators.

"Superacids" refer to acids that are stronger than concentrated 100 percent sulfuric acid with pKa=3. Examples are fluorosulfonic acid, fluoroantimonic acid, perhalogenated carboranes and others.

The structural formula "Structure I" shows the cationic portion of a tape accelerator in a preferred working example of the present invention.

"Cationic tape accelerator" refers to a tape accelerator in ionogenic form, the cation of which initiates cationic polymerization in a liquid impregnating agent, especially the cationic homopolymerization of an initially charged impregnating resin.

A compound "in ionogenic form" refers to heteropolar compounds, chemical reactivity of which is shaped by the presence of a cation and anion in the compound. Conventional "ionogenic" compounds are salts. But even complex structures with cationic and anionic character are referred to in the present context as compounds "in ionogenic form".

A "sulfonium-containing cation" is a cation comprising, in the molecule, as well as the anion or anions, a unit described by the singly positively charged structures II or III or by the empirical formula $[SR_3]^+$.

"Alkylarylsulfonium" or "dialkylarylsulfonium" refers here to a sulfonium-containing cation in which one or two of the three "R" radicals on the sulfur atom in the sulfonium cation are alkyl groups. Alkyl groups are parts of a molecule that consist of mutually bonded carbon and hydrogen atoms. In the context of the invention, preferred alkyl radicals are those having 1 to 12 carbon atoms, which may be branched or linear. The alkyl groups are preferably bonded monovalently to the central sulfur atom.

In the case of a dialkylaryl-sulfonium cation, there are one or two alkyl radicals which may in turn be the same or different.

"Arylalkylsulfonium" or "diarylalkylsulfonium" refers here to a sulfonium-containing cation in which one or two of the three "R" radicals on the sulfur atom in the sulfonium cation are alkyl groups. Aryl groups are parts of a molecule appended monovalently or by a single bond to the carbon skeleton, or to the sulfur atom, and having at least one aromatic system that may be wholly or partly substituted or unsubstituted.

In the case of an arylalkylsulfonium cation, there may be one or two aryl radicals which may in turn be the same or different.

The third radical may be as desired, i.e. including an alkyl group or an aryl group, wholly or partly substituted or not.

An aryl group is an organochemical radical having an aromatic base skeleton. It is the term for a monovalent group of atoms that derives from aromatic hydrocarbons by removal of a hydrogen atom bonded to the ring. Most aryl groups derived from benzene; the simplest aryl group is the phenyl group.

In some embodiments, there is at least one aryl group in the sulfonium cation.

In some embodiments, there is at least one monocyclic aryl group, i.e., for example, an aryl group with an aryl structure derived from benzene, for example phenyl or benzyl.

In some embodiments, there is at least one substitution on a monocyclic aromatic radical of the aryl group of the sulfonium-containing cation, i.e. a hydrogen atom on the aromatic ring has been replaced, for example by a functional group or an alkyl group.

The functional group may be present here with or without a heteroatom such as oxygen, nitrogen, sulfur, phosphorus.

In some embodiments, there is an aryl group in which a hydrogen on the aromatic ring has been replaced by an acetyloxy group.

In some embodiments, the tape accelerator is a sulfonium-containing cation combined with a hexafluoroantimonate anion.

The corona shield tape accelerator may take the form of a mixture of at least two cationic tape accelerators that each have a different sulfonium cation. The anions may be the same or different, especially hexafluoroantimonate as anion.

The corona shielding tape accelerator, no matter what the present as a single compound or as a mixture, may have a melting point within a range from 145° C. to 165° C., or within a range from 150° C. to 160° C.

The present disclosure also describes the use of the reactive corona shielding tape for production of an anhydride-free insulation system by impregnating the solid corona shielding tape with an impregnating agent, wherein the impregnating agent comprises an aromatic and/or cycloaliphatic impregnating resin which is anhydride-free and contains epoxy groups.

Suitable anions in the cationic tape accelerator are especially anions of complex structure, such as hexafluoroantimonate anion, and so the tape accelerator present is, for example, 4-acetyl-oxyphenyldimethylsulfonium hexafluoroantimonate—CAS No. 135691-31-5—Structure I.

There follows a detailed elucidation of the teachings herein with reference to an application example that describes an example embodiment:

Through use of the sulfonium superacid derivative 4-acetyloxy-phenyldimethylsulfonium hexafluoroantimonate specified in structure I, in an aqueous blend with preferably silanol group-modified polyvinylalcohol and platelet-shaped filler that has been doped, for example rendered partly conductive, with tin oxide, and organic solvents, for example 2-butanone, and water, it is possible to prepare a paint which is capable of impregnation/application onto polymer and/or glass weave carriers, and with which, after drying, it is possible to establish a layer of desired inventive conductivity, i.e. with square resistances in the range of $R_{\square}$=1-10 kohms over a temperature range of 20-150° C., on the polymer carrier and/or glass weave carrier.

By using a sulfonium superacid derivative as crosslinking accelerator, this novel corona shielding tape is suitable for curing of conventional epoxy resin-phthalic anhydride mixtures, and also novel, i.e. anhydride-free, impregnating agents with epoxy resins, especially in combination with cycloaliphatic epoxy resins. Such sulfonium superacid derivative(s) are capable of gelating and curing bisphenol A diglycidyl ethers, bisphenol F diglycidyl ethers, glycidyl esters, aliphatic and/or cycloaliphatic epoxy resins, in each case alone or else in any combination. Successful tests have already been conducted with cycloaliphatic epoxy resins in a mixture with BADGE (bisphenol A diglycidyl ether).

It has been found that, for the purposes of tape stability, with regard to the electrical conductivity of the layer, it is additionally possible to apply a shaping crosslinker, but the tape has sufficient stability for winding even without shaping crosslinker.

The corona shielding tape thus produced via subsequent hot air curing, in the case of thermal impregnation at 70° C. and subsequent hot curing at 140° C. with anhydride-free epoxy resin or a mixture of about 80% by weight of cycloaliphatic epoxy resin and about 20% by weight of distilled bisphenol A diglycidyl ether, has only minor, disadvantageous swelling characteristics, and so the square resistance set originally in the corona shielding tape is maintained even during and after curing with liquid epoxy resin, of anhydride-free nature, mainly but not exclusively of cycloaliphatic structure, and hence the partly conductive characteristics are preserved on application of the corona shielding tape in electrical machine for dissipation of high electrical field strength in stator windings.

A paint is produced by dissolving 20.0 g of 4-acetyloxydimethylsulfonium hexafluoro-antimonate in 200.0 g of ethyl methyl ketone. This clear organic solution was added dropwise at room temperature while stirring gradually to a suspension of 590.0 g of Iriotec 7320 (from Merck KGaA, Darmstadt) and 108.7 g of Poval™ 25-98 R (from Kuraray Europe GmbH, Hattersheim am Main) in 2400.0 g of distilled water, and the mixture was stirred at room temperature for a further 30 min, for example by dissolver with a toothed dispersing disk, in order to reduce the size of any agglomerates in the region close to the disk by shearing.

This turquoise-shimmering paint suspension was then applied to 200 mm-wide blended glass/polyester fabric with basis weight 44.7 g/m² (from Krempel GmbH, Vaihingen/Enz) by means of dipping application in a basecoater belt impregnation system (from COATEMA Coating Machinery GmbH, Dormagen) and dried vertically at belt surface temperature about 120° C. in a hot air fan oven at a belt speed of 0.8 meter/minute over a length of 1.5 m. The result was application of a total amount of dry matter on the tape of 27.48 g/m², with 0.77 g/m² of 4-acetyloxyphenyldimethyl-sulfonium hexafluoroantimonate as accelerator substance, 22.56 g/m² of Iriotec 7320 as partly conductive material for termination, and 4.16 g/m² of Poval™ 25-98 R as binder. In total, the tape thus had a specific total basis weight of about 72 g/m².

The tack-free, low-odor, turquoise-colored, robust and novel corona shielding tape that had excellent tactile properties and very good windability had a square resistance $R_\square$=6.5 kohm at 20-23° C., measured by means of a 10 cm² 3501FE high-resistance flexible-tongue electrode according to DIN 53482 or DIN EN 62631-3-2 (from H.-P. Fischer Electronik GmbH & Co., Mittenwalde).

In order to examine the critical swelling characteristics of the novel corona shielding tape during VPI impregnation and during hot curing in phthalic anhydride-free epoxy resin of the invention based on mixtures of cycloaliphatic epoxy resin and glycidyl ether epoxy resin, two corona shielding tape strips of dimensions 12 cm×2.5 cm were prepared and the ends were provided with commercial conductive silver varnish over a centimeter of width at either end, so as to obtain two electrically contactable corona shielding tape strips of dimensions 10 cm×2.5 cm. These strips were contacted with heat-resistant crocodile clips on the conductive silver varnish contact and connected to an Almemo® 2890-9 multichannel precision measuring instrument (from Ahlborn Mess-und Regelungstechnik GmbH, Holzkirchen) for continuous recording of the resistance.

The corona tape strips were then transferred to an air circulation oven, in each case under tension in the middle by means of weights, and dipped completely for four hours into a phthalic anhydride-free epoxy resin mixture at 70° C., consisting of 80% by weight of cycloaliphatic epoxy resin of the 3,4-epoxy-cyclohexylmethyl 3',4'-epoxycyclohexanecarboxylate (Celloxide™ C2021P, from Daicel Corporation, Tokyo; CAS No. 2386-87-0) and 20% by weight of distilled bisphenol A diglycidyl ether (Epikote™ Resin 162, from Hexion GmbH, Iserlohn; CAS No. 1675-54-3).

After this period of time of four hours that simulates the 70° C. VPI impregnation phase, the electrically contacted corona shielding tape strips were lifted out of the resin, subjected to thermal hot curing in an oven at 145° C. for ten hours and then cooled to room temperature. During this period, electrical resistance was recorded continuously. By conversion of the resistance recorded over time to the square resistance (10 cm×2.5 cm), it was found that, surprisingly, the ideal resistance characteristic of the novel corona shielding tape within a range of 1-10 kohm is maintained over the complete temperature range of ° C., and hence is highly suitable for termination of electrical fields at windings in anhydride-free, VPI epoxy resin-impregnated, electrical machines and generators.

In order to verify that the accelerator had been washed out of the novel corona shielding tape, what is called a resin contamination experiment or accelerator availability test was additionally conducted. For this purpose, two corona shielding tape strips of dimensions 2.5 cm×4.8 cm (12 cm²) were prepared, and each was exposed to 30 g of the abovementioned (alkyl)phthalic anhydride-free epoxy resin (80% by weight of 3,4-epoxycyclohexylmethyl 3',4'-epoxycyclohexanecarboxylate/20% by weight of distilled bisphenol A diglycidyl ether) at 70° C. for four hours. Thereafter, the impregnated corona shielding tape strips were removed from the liquid, and this remaining epoxy resin mixture was stored at 100° C. for a further 20 hours. After cooling to 70° C., the dynamic viscosity ($\eta_{sample1,\ 20\ h/100°\ C.}$, $\eta_{sample2,\ 20\ h/100°\ C.}$) was determined in each case. With subtraction of a corona shielding tape-free resin blank value ($\eta_{BW,\ 20\ h/100°\ C.}$), the following values or properties were found:

$\eta_{BW,\ 20\ h/100°\ C.}$=24.87 mPa·s $\eta_{sample1,\ 20\ h/100°\ C.}$=43.78 mPa·s $\eta_{sample2,\ 20\ h/100°\ C.}$=56.93 mPa·s Appearance$_{sample1\&2,\ 20\ h/100°\ C.}$=corona tape strips are stiff, no tack Accelerator availability$_{sample1,\ 20\ h/100°\ C.}$=43.78 mPa·s-24.87 mPa·s=18.91 mPa·s Accelerator availability$_{sample2,\ 20\ h/100°\ C.}$=56.93 mPa·s 24.87 mPa·s=32.06 mPa·s Also examined was the reactivity of the novel corona shielding tape after storage at room temperature for up to four weeks. For this purpose, diecut samples were taken from the corona shielding tape and wetted with anhydride-free epoxy resin (80% by weight of 3,4-epoxycyclohexylmethyl 3',4'-epoxycyclohexanecarboxylate/20% by weight of distilled bisphenol A diglycidyl ether) in a DSC crucible, and the enthalpy of rection was determined by dynamic differential calorimetry (from Netzsch-Gerätebau GmbH, Selb; DSC Phoenix F1) at 10 K/min (cf. FIG. 5). The stability of the novel corona shielding tape was shown by fairly constant enthalpies of reaction (about 300-400 joules per gram of epoxy resin mixture).

Proceeding from the new generation of insulation systems that are producible by impregnating with anhydride-free impregnating agents, the present disclosure for the first time describes a corona shielding tape into which it is possible to deposit a tape accelerator of good suitability that rapidly initiates homopolymerization. The tape accelerator is in the form of a salt of a superacid and is storage-stable at a temperature of +6° C. to 23° C. in a corona shielding tape containing at least some amount of polyvinylalcohol as polymer matrix for up to 6 months.

What is claimed is:

1. A corona shielding tape for further processing to produce an insulation system comprising an impregnated winding with potential control via outer corona shielding "AGS" and/or internal potential controller "IPS" and/or terminal corona shielding "EGS", the insulation system produced by impregnating the winding with an anhydride-free and resin-based impregnating agent at 45-85° C. and under reduced pressure, the corona shielding tape comprising:

a carrier tape;

a tape adhesive;

an electrically conductive and/or partly conductive filler in a polymer matrix; and a tape accelerator suitable for curing and/or gelation of the impregnating agent;

wherein the filler comprises at least one component selected from the group consisting of: antimony-doped tin oxide, silicon carbide, and aluminum-doped silicon carbide;

the polymer matrix contains at least one polyvinylalcohol and/or a polyvinylalcohol copolymer;

the tape adhesive, the filler, and the tape accelerator are inert to each other and therefore stable in storage at a temperature from 6 degrees to 23 degrees C. for six months; and the accelerator comprises at least one of a superacid or a superacid salt including a sulfonium cation suitable for acceleration of a cationic homopolymerization of the resin-based anhydride-free impregnating agent.

2. The corona shielding tape as claimed in claim 1, wherein a basis of the resin-based impregnating agent comprises an anhydride-free epoxy resin.

3. The corona shielding tape as claimed in claim 1, wherein sulfonium cation includes an aryl radical.

4. The corona shielding tape as claimed in claim 1, wherein multiple tape accelerators are present in combination.

5. The corona shielding tape as claimed in claim 1, wherein the sulfonium cation includes an arylalkyl-sulfonium cation.

6. The corona shielding tape as claimed in claim 1, further comprising a dialkylarylsulfonium cation.

7. The corona shielding tape as claimed in claim 1, further comprising an aryl radical of a sulfonium cation in substituted form.

8. The corona shielding tape as claimed in claim 1, wherein the tape accelerator includes a sulfonium cation having an aryl radical comprising a acetyloxy phenyl radical.

9. The corona shielding tape as claimed in claim 1, wherein the tape accelerator comprises a superacid salt having the following chemical structure:

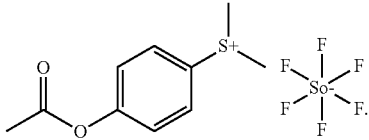

10. The corona shielding tape as claimed in claim 1, wherein the polymer matrix comprises multiple polyvinylalcohols.

11. The corona shielding tape as claimed in claim 1, wherein the polymer matrix comprises at least one polyvinylalcohol having crosslinked components.

12. The corona shielding tape as claimed in claim 1, wherein the filler comprises at least one component selected from the group consisting of: carbon black, graphite, and carbon nanotubes.

* * * * *